United States Patent Office 3,017,372
Patented Jan. 16, 1962

3,017,372
METHOD OF MAKING A LIQUID-FILLED SYNTHETIC RESIN STRUCTURE AND ARTICLE OBTAINED THEREFROM
Ralph H. Clark, Westwood, N.J., assignor to Burroughs Corporation, Detroit, Mich., a corporation of Michigan
No Drawing. Filed Nov. 25, 1958, Ser. No. 776,179
11 Claims. (Cl. 260—2.5)

The present invention relates to a method of making liquid-filled solid structures and to the articles produced thereby, and more particularly to articles formed as a solid synthetic resin base which contain a large supply of liquid that is expressible from the solid base when pressure is applied. The invention is eminently suited for, and is therefore particularly described below in connection with, the production of such articles and structures wherein the expressible liquid is an ink vehicle carrying coloring matter and wherein a life-time supply of expressible liquid ink is produced with the formation of the solid resin base.

The general type of composition having the above characteristics has been used for making carbon paper (the composition being applied as the "carbon" transfer coating), and also has been used for making self-supporting, shaped inking articles. The method of the present invention is particularly suited for making the latter type of inking articles, such as ink pads, ink rolls, marking stamps, and the like, in which the solid resin base possesses good physical strength and durability and which contains a life-time supply of ink, the articles being disposable when the base is physically worn out and/or the ink is depleted.

Synthetic resin types of ink-filled compositions have been known for some time, as shown for example by Australian Patent No. 10,136 of 1932. A more recent composition is disclosed in U.S. Patent No. 2,820,717 of January 21, 1958. These patents disclose compositions of this character used as transfer coatings for carbon paper which are applied to the paper backing in the form of a volatile-solvent solution of the resin.

It has also been proposed to prepare ink-filled compositions without the use of volatile solvents, by fusing a mixture of the resin in a liquid vehicle which includes a plasticizer and non-solvent organic liquids. These are more readily adaptable for preparing self-supporting inking articles, such as stamp pads and marking stamps.

An example of a fusing method is disclosed in U.S. Patent No. 2,777,824 of January 15, 1957. According to this patent, an ink filled microporous microreticulated structure for use as a marking stamp was produced by heating a mixture comprising the resin (polyvinyl chloride, polyvinyl acetate, polyethylene, or polyvinyl butyral), a plasticizer for the resin, and a non-solvent, or incompatible, organic liquid containing coloring matter (i.e. the ink), to a temperature at which the resin fuses and under a pressure sufficient to maintain the liquid in the liquid phase until the microreticulated structure was formed. The ink was said to be entrapped within pores formed in the spaces between the fused resin particles, and was releasable to make an impression when pressure was applied.

In contrast to the above method, the present invention relates to another fusing method of making liquid-filled articles, particularly inking articles in which the porous structure in the resin base is produced by the inclusion of a chemical blowing agent which releases a gas in the course of practicing the method. The method is preferably performed in an open-top mold so that no pressure is applied during the heating steps. The preferred embodiments of the method, as will be described below, involve two heating steps; the first, which is at a lower temperature, causes the blowing agent to release its gas to form the porous or cellular structure; and the second, which is at a higher temperature, causes the fusion of the resin particles. The initial mixture used in the method includes a quantity of a non-solvent, nonvolatile liquid, such as secondary plasticizer, in sufficient amounts to exceed its compatibility limit with the resin. It is believed, as will be discussed below, that the plasticizer-polymer bond between the secondary plasticizer and the resin polymer chains is of sufficiently low stability that considerable amounts of secondary plasticizer are free to migrate within the porous resin base and to collect within the pores produced by the blowing agent. It is the non-solvent, non-volatile liquid carrying the coloring matter which constitutes the liquid ink that is expressible from the resin base when pressure is applied.

The present method has been found to produce self-supporting, shaped inking articles of greater physical strength and durability and incorporating a larger supply of liquid ink than produced by the methods heretofore known. Also, the articles exhibit a very rapid ink recovery after each impression. An especially important characteristic observed in these articles is that their surfaces stay relatively dry, the liquids exhibiting less of a tendency to bleed out or drip from the article during use or upon standing. These advantages are important for certain types of inking articles, such as ink rolls, which must take a lot of physical punishment in order to have a relatively long useful life, and which must remain relatively clean and not drip even under relatively hot ambient conditions. Ink rolls produced according to this method can make in the order of several hundred thousands of clear impressions before physically wearing out the resin base or depleting the ink. It will be appreciated that ink rolls of this order of life can be used as disposable articles to simplify the design of numerous types of printing apparatus by obviating the need of inking reservoirs and transfer rolls and/or ink ribbons and their feeding mechanisms heretofore used for inking the printing elements or applying the printed impressions. The method can also be used for making long lasting inking articles of other types, such as ink pads and marking stamps, which are disposable after their useful life has passed. By leaving out the colorant, the method can also be used for making liquid-filled articles for controlled dispensing of the liquid, other than inking articles.

An object of the invention is to provide a method of making liquid-filled solid synthetic resin structures having very good physical strength and durability, which incorporate a large initial supply of liquid, and which exhibit less of a tendency to bleed out or drip during use or upon standing.

A further object of the present invention is to provide a method of making improved inking articles having the above properties.

A still further object of the present invention is to provide improved liquid-filled solid synthetic resin structures, particularly long lasting inking articles.

More particularly describing the invention, and especially when the invention is used for preparing inking articles, the method involves first dispersing, in liquid organic vehicles, the synthetic resin in the form of finely divided particles, the coloring matter, and a chemical blowing agent operable to evolve gas when heated to the blowing temperature. The liquid organic vehicles include a primary plasticizer for the resin, and further include a quantity of a non-volatile, non-drying, organic liquid, such as a secondary plasticizer, in sufficient amount to substantially exceed its compatibility limit with the resin. The above dispersion, which is liquid at ordinary temperatures, is poured into an open-top mold and is heated to the blowing temperature to release the gas from the blowing agent. It is then further heated to a higher temperature to fuse the resin particles. Upon cooling, a resilient porous solid resin base is formed from which amounts of the secondary plasticizer carrying the coloring matter are expressible when pressure is applied.

When the dispersion is heated to the blowing temperature to release the gas from the blowing agent, a porous mass having a network of open interconnecting pores or cells is produced. The porous mass, however, does not have any physical strength. Heating the mixture to the higher temperature fuses the resin particles which, upon cooling, forms a porous mass of good physical strength which serves as the porous resin base for the expressible ink.

It appears that the mechanism by which the secondary plasticizers and coloring matter are formed so as to be expressible from the porous base is related to the broader mechanism of plasticization of any polymeric resin by primary plasticizers and secondary plasticizers. The explanations of plasticizer action all seem to propose the formation of some type of loose bond between the resin polymer and the plasticizer. See, for example, "Modern Plastics" Encyclopedia Issue, September 1957, page 31, and page 754 of "The Encyclopedia of Chemistry" by G. L. Clark and G. G. Hawley, Fifth Edition, copyrighted 1957 by Reinhold Publishing Corp. As discussed, for example, on page 31 of the "Modern Plastics" publication, this bond formation apparently causes the polymer chains to be pushed apart and to be surrounded with a liquid phase. In the case of active or primary plasticizers, the plasticizer-polymer bonds appear to have greater stability. On the other hand, in the case of secondary plasticizers, the plasticizer-polymer bonds appear to be of lower stability, leaving free liquid which migrates within the resin and which is exudable therefrom.

Consistent with these theories explaining plasticizer action, it appears that during the fusion of the resin in the present method, the primary plasticizer forms a plasticizer-polymer bond of high stability, and therefore the primary plasticizer does not leave free liquid to migrate within the resin. However, the secondary plasticizer, being present in relatively high concentrations and having a plasticizer-polymer bond of low stability, does leave substantial amounts of free liquid which migrates within the fused resin. The porous structure of the fused resin, produced by the blowing agent, seems to hold the liquid within the resin with little tendency to bleed or drip until it is caused to be expressed therefrom by pressure.

The above appears to be a plausible explanation of what occurs in the practice of the method, but it will be appreciated that this explanation is not set forth with certainty. Another explanation may be based on "syneresis," which is the phenomenon involved in the exudation of a liquid from a gel.

Articles can be produced by this method having varying degrees of resiliency to enable the article to more readily conform to the shape of the surface to be inked. The porosity of the resin base can also be controlled as by the relative amount of blowing agent incorporated in the dispersion, and the quantity of ink formed in the resulting article is largely determined by the relative amount of secondary plasticizer included.

The preferred examples of the invention described below utilize a nitrogen-releasing blowing agent to produce an open cellular structure in the article, although it will be appreciated that other well known types of gas-releasing materials could be used, such as those releasing carbon dioxide for example. It has been found that a very fine and uniform cell structure is produced by using N,N'-dimethyl-N,N'-dinitroso terephthalamide, disclosed in U.S. Patent No. 2,754,326, which is the preferred blowing agent disclosed in the examples. This material is generally included in lesser amounts than normal in the art of making cellular plastics, and preferably ranges from about 0.1 part to about 5 parts per 100 parts of the resin, by weight, depending upon the resiliency, sharpness of impression, quantity of ink desired in the finished inking article, and the other ingredients used in the composition. When this blowing agent is used, the gas is preferably released by heating the dispersion to a temperature of 210°–250° F.

For inking articles, the resin is preferably a thermoplastic resin of the vinyl chloride type, that is polyvinyl chloride or copolymers relatively high in polyvinyl chloride content. Polymers of vinyl chloride, or copolymers thereof obtained by polymerizing at least 95% of vinyl chloride and up to 5% of a monomer copolymerizable therewith, have been found to impart especially desirable ink-transfer and wear characteristics to the finished inking article. The examples described below use polyvinyl chloride, preferably fused at 350° F.–380° F.; and copolymers thereof obtained by polymerizing about 95% vinyl chloride and about 5% dimethyl maleate, preferably fused at 280° F.–300° F. Blends with minor amounts of other resins, such as copolymers of vinyl chloride-vinyl acetate and vinyl chloride-vinylidene chloride containing a smaller proportion of polyvinyl chloride, may also be used.

The primary plasticizer is one or a mixture of many plasticizers that are normally used in preparing plastisol dispersions of the resin. That is, at ordinary room temperatures the plasticizer wets and disperses the resin particles, and upon heating to the fusing temperature it becomes an active solvent for the resin to facilitate its fusion.

The primary plasticizers are preferably a mixture selected so that the fusion point of the dispersion is not reached until after the blowing agent has released the gas. To avoid the premature fusion of the resin during the heating steps, high-solvating types of plasticizers such as dioctyl phthalate, if used at all, should be diluted with less active plasticizers. The latter type of plasticizers preferably include the polymeric type such as epoxy polyester plasticizers. In addition, there may also be included a quantity of the less active plasticizers which tend to retard the fusion of the resin, as for example dicapryl phthalate.

The liquid vehicle for the expressible ink is the non-volatile, non-drying, relatively non-solvent liquids, preferably secondary plasticizers, which are added to the mixture in sufficient concentration to exceed their compatibility limits with the resin, so that they will migrate within the resin after it is fused and will be expressible therefrom when pressure is applied. They may be selected from the substantially non-drying, non-volatile secondary plasticizers which are partially compatible with the resin, including fatty acids such as oleic acid; esters such as isopropyl palmitate, diglycol laurate, diglycol oleate, or polyesters such as glyceryl polyricinoleate (blown castor oil); animal oils such as sperm oil; and vegetable oils such as peanut oil. Materials which are almost completely incompatible with the resin, such as mineral oils, are not as desirable since they tend to weaken the physical strength and cohesiveness of the resin base.

These secondary plasticizers are preferably included in the form of a mixture of a plurality of such compounds. They may be included over somewhat a broad range of proportions depending upon those selected and the amount of expressible liquids desired to be incorporated. In general, they may be present from about 20 parts to about 100 parts, by weight, per 100 parts of the resin, but even this range may vary depending upon the materials selected. The use of castor oil (blown), or glyceryl polyricinoleate, as the major portion of the secondary plasticizers, preferably also with oleic acid, has been found to enable the production of inking articles having very good physical strength, durability and inking characteristics.

The coloring matter included in the mixture is carried by the secondary plasticizers when the latter are caused to be expressed from the fused resin base. The coloring matter may be soluble dyes or pigments suspended in the secondary plasticizers. Dyes tend to produce more intense impressions, but have a greater tendency to bleed, and some are subject to be deleteriously affected by the fusion temperature. A suitable dye is Luxol Blue MBSN, a product of E. I. du Pont de Nemours & Co., in a diethylene glycol vehicle, two parts of vehicle per part of dye, by weight. In this case, the diethylene glycol is the non-volatile, non-solvent liquid and is present in the composition in sufficient concentration to be expressible from the resin after fusion. The Luxol Blue MBSN is a spirit soluble derivative of copper phthalocyanine. If pigments are used, they should be selected for lower oil absorption properties and may be included in the mixture over somewhat of a broad range of proportions within workable mixture viscosities. For blue inks, it is preferred to use flushed alkali blue pigments.

The mixture may also include a heat stabilizer for the vinyl chloride resin, such as dibasic lead phosphite. However, the epoxy-type plasticizers exhibit heat stabilizing properties, and when they are present, generally no additional stabilizers are necessary.

In addition, fillers or wetting agents may be included as desired, or other additives may be included to impart certain desired characteristics. For example, a minor amount of a liquid silicone may be added to the mixture when used for preparing ink pads in order to reduce tack.

Following the several examples of inking articles produced in accordance with the invention:

*Example 1*

This example was used in making an ink roll.

A dispersion of the following ingredients was prepared, the parts being by weight per 100 parts of the resin:

| | |
|---|---|
| Geon 121 | 100 |
| Flushed alkali blue paste | 213 |
| Paraplex G-62 | 50 |
| Dicapryl phthalate | 43 |
| HB-40 | 17 |
| Oleic acid | 20 |
| Blowing agent | 1.0 |

Geon 121, a product of B. F. Goodrich Company, is polyvinyl chloride.

The flushed alkali blue paste is a pre-mixed paste composed of about 40% alkali blue pigment flushed in about 30% blown castor oil and about 30% dibutyl phthalate.

Paraplex G-62, a product of Rohm & Haas Company, is a high molecular weight epoxy polyester type primary plasticizer.

Dicapryl phthalate, is also a primary plasticizer for the resin, but tends to retard fusion of the resin until the gas formation is complete.

HB-40, a product of Monsanto Chemical Company, is a hydrocarbon-type primary plasticizer consisting essentially of a mixture of partially hydrogenated isomeric terphenyls.

The blowing agent is du Pont BL-353, a product of E. I. du Pont de Nemours & Co., made up of approximately 70% of the above-mentioned nitrogen releasing N,N'-dimethyl-N,N'-dinitroso terephthalamide and 30% inert diluent.

The above were mixed in a roller mill until a uniform, free-flowing dispersion was obtained. The dispersion was then poured into an open-top mold configured in the shape of an ink roll. It was then heated to 248° F. and maintained at this temperature for about five minutes. During this time, the blowing agent released its nitrogen. The temperature was then gradually raised to 380° F. over a period of about three minutes, and maintained at this temperature for about an additional five minutes. During this time, the fusion of the resin was completed. The mold was then permitted to air cool to room temperature, and the fused ink roll was removed.

The ink roll was placed in a commercial stamp posting machine in place of the normal offset ink roll and liquid ink reservoir, and produced a large number of impressions of a sharpness and uniformity at least as good as those of the replaced inking roll with its ink reservoir.

*Example 2*

This example was used in making a life-time ink pad for use with hand stamps.

A dispersion of the following ingredients was prepared, the parts being by weight per 100 parts of the resin:

| | |
|---|---|
| Pliovic AO | 100 |
| Flushed alkali blue paste | 175 |
| Plastolein 9720 | 90 |
| Dicapryl phthalate | 75 |
| Castor oil (blown) | 20 |
| Oleic acid | 5 |
| Silicone | 10 |
| Blowing agent | 0.5 |

Pliovic AO, a product of Goodyear Tire and Rubber Co., is a resin produced by copolymerizing about 95% vinyl chloride and about 5% dimethyl maleate. This resin may be used in preparing ink pads, as such articles require less physical strength than the ink rolls.

The flushed alkali blue paste is the same pigment-oil-plasticizer paste as the preceding example.

Plastolein 9720, a product of Emery Industries, Inc., is a polyester composed essentially of the condensation products of azelaic acid and a diol. It is a primary plasticizer for the resin.

The silicone is a liquid additive for purposes of reducing tack.

The blowing agent is the same BL-353 material used in the preceding example.

The above ingredients were also mixed in a roller mill until a uniform, free-flowing dispersion was obtained. The dispersion was then poured into an open-top mold configured in the shape of an ink pad. It was then heated to 248° F. and maintained at this temperature also for about five minutes to release the gas. The temperature was then gradually raised to 284° F. over a period of about three minutes, and maintained at this temperature for about an additional five minutes to complete the fusion of the resin. After the mold was cooled to room temperature, the smooth coherent film formed at the upper surface, closest to the open top of the mold, was peeled away to expose the porous inking surface.

*Example 3*

The following example illustrates the use of heat-convertible monomeric plasticizers as part of the primary plasticizer system. The monomeric plasticizer is used as part of the organic liquid vehicle to aid in dispersing the resin particles. It is compatible with the other vehicles but does not solvate the resin at ordinary temperatures. At the fusing temperature, it polymerizes rapidly to blend with the vinyl resin forming a resin blend therewith as the porous base from which the liquid ink is expressible. The heat-convertible monomeric plasticizer used in the example given below is diethylene glycol dimethacrylate.

This example was used in preparing an ink roll.

A dispersion of the following ingredients was prepared, the parts being by weight per 100 parts of the resin:

| | |
|---|---|
| Geon 121 | 100 |
| Flushed alkali blue paste | 185 |
| Heat-convertible monomeric plasticizer | 48 |
| Paraplex G-62 | 10 |
| Oleic acid | 23 |
| Blowing agent | 4 |

This dispersion was used in producing an ink roll by following the same method steps as in Example 1 above.

*Example 4*

The same composition as set forth in Example 3 above was used in preparing an ink pad, with the exception that the oleic acid was replaced by an equal weight of blown castor oil. An ink pad was produced in accordance with the same method steps as set forth in Examples 1 and 3 above.

*Example 5*

Following is a further example illustrating a composition for making inking articles incorporating a red ink. This example was used in preparing an ink roll.

A dispersion of the following ingredients was prepared, the parts being by weight per 100 parts of the resin.

| | |
|---|---|
| Geon 121 | 100 |
| Flushed red pigment | 213 |
| Paraplex G-62 | 50 |
| Admex 710 | 43 |
| Castor oil (blown) | 27 |
| Oleic acid | 20 |
| Blowing agent | 1 |

The flushed red pigment used is Sherwin-Williams Brilliant Red FL-10-703, which is comprised of about 40% red pigment flushed in about 60% dioctyl phthalate.

Admex 710, a product of Archer-Daniels-Midland Co., is an epoxy polyester which, together with the Paraplex G-62 and the dioctyl phthalate, serves as a primary plasticizer for the resin.

The remaining ingredients including the blowing agent are identified in the preceding examples.

As distinguished from the other examples, there is no secondary plasticizer in the pre-mixed pigment, so that the only secondary plasticizers are the castor oil and the oleic acid ingredients, which together are present in about 47 parts per 100 parts of the resin.

The dispersion was poured into an open-top mold and was subjected to the same heating steps as set forth in Example 1.

*Example 6*

This is an example of a composition utilizing a dye, instead of pigments as in the preceding examples, for preparing an ink roll. The ingredients are set forth as parts by weight per 100 parts of the resin:

| | |
|---|---|
| Geon 121 | 100 |
| Luxol fast blue MBSN | 20.5 |
| Diethylene glycol | 41 |
| Benzoflex 9-88 | 68 |
| Admex 710 | 37 |
| Polyethylene glycol 400 dioleate | 2 |
| Blowing agent | 0.5 |

Luxol fast blue MBSN is the above-mentioned blue dye supplied by E. I. du Pont de Neumours & Co.

Diethylene glycol is a solvent for the dye but is present in sufficient concentration to exceed its compatibility limit with the resin so that it, like the secondary plasticizers of the preceding examples, tends to migrate within the resin after fusion and is expressible therefrom.

Benzoflex 9-88, a product of Tennessee Products, is dipropylene glycol dibenzoate, a primary plasticizer for the resin.

Admex 710, a product of Archer-Daniels-Midland Co., is an epoxy polyester, also a primary plasticizer for the resin.

Polyethylene glycol 400 is a polyoxyethylene glycol wetting agent, a product of Carbide and Carbon Chemicals Company, having a freezing point of 4 to 10° C.

The blowing agent and the remaining constituents are the same materials identified in the preceding examples.

A dispersion of the above materials was prepared and poured into an open top mold configured for producing an ink roll, and was treated in accordance with the same procedure as in Examples 1 and 3 to produce an ink roll.

While the invention has been particularly described with reference to preferred embodiments thereof for the production of inking articles, it will be appreciated that it could be used also for making other types of liquid-filled solid structures to contain a large supply of expressible liquids. There will be readily apparent to those skilled in the art many other variations, modifications, and equivalents of the described preferred embodiments coming within the spirit and scope of the invention as defined in the following claims:

I claim:

1. A method of making a liquid-filled synthetic resin structure which comprises a solid resin base and liquids expressible therefrom under pressure, the method comprising: dispersing a vinyl chloride resin and a blowing agent in liquid organic vehicles, said blowing agent being decomposable by heat to evolve a gas, said liquid organic vehicles comprising a plasticizer operative to facilitate fusion of the resin when heated to the fusion temperature, said liquid organic vehicles further comprising a non-drying organic liquid which is substantially non-volatile at the fusing temperature of the resin and which is present in sufficient concentration to exceed to a substantial extent its compatibility limit with the resin; heating the dispersion to cause the blowing agent to evolve a gas; further heating the dispersion to cause the resin particles to fuse, thereby forming, upon cooling, a fused porous solid in which substantial amounts of said non-drying non-volatile organic liquid are free to migrate and to be expressible therefrom under pressure.

2. A method of making a liquid-filled synthetic resin structure which comprises a solid resin base and liquids expressible therefrom under pressure, the method comprising: dispersing a vinyl chloride resin and a chemical blowing agent in liquid organic vehicles, said blowing agent being decomposable by heat to evolve an inert gas, said liquid organic vehicles comprising a plasticizer operative to facilitate fusion of the resin when heated to the fusion temperature, said liquid organic vehicles further comprising a non-drying, organic liquid which is substantially non-volatile at the fusing temperature of the resin and which is present in sufficient concentration to exceed to a substantial extent its compatibility limit with the resin; heating the dispersion to the blowing temperature of the blowing agent to effect the release of a gas; raising the temperature to the resin fusion temperature to fuse the resin particles; and then cooling the fused product to room temperature, thereby forming a fused porous solid in which substantial amounts of said non-drying, non-volatile organic liquid are free to migrate and to be expressible therefrom under pressure.

3. A method of making an ink-filled synthetic resin structure which comprises a solid resin base and liquid ink expressible therefrom under pressure, the method comprising: dispersing a vinyl chloride resin, a blowing agent and coloring matter in liquid organic vehicles, said blowing agent being decomposable by heat to evolve an inert gas, said liquid organic vehicles comprising a plasticizer operative to facilitate fusion of the resin when heated to the fusion temperature, said liquid organic vehicles further comprising a non-drying organic liquid which is substantially non-volatile at the fusing temperature of the resin and which is present in sufficient concentration to exceed its compatibility limit with the resin; heating the dispersion to cause the blowing agent to evolve a gas; further heating the dispersion to cause the resin particles to fuse, thereby forming, upon cooling, a fused porous solid in which substantial amounts of the non-drying, non-volatile organic liquid carrying the coloring matter are free to migrate and to be expressible therefrom under pressure.

4. A method of making an ink-filled synthetic resin structure which comprises a solid resin base and liquid ink expressible therefrom under pressure, the method comprising: dispersing a vinyl chloride resin, a chemical blowing agent, and coloring matter in liquid organic vehicles, said blowing agent being decomposable by heat to evolve an inert gas, said liquid organic vehicles comprising a plasticizer operative to facilitate fusion of the resin when heated to the fusion temperature, said liquid organic vehicles further comprising a non-drying organic liquid which is substantially non-volatile at the fusing temperature of the resin, substantially a non-solvent for the resin, and present in sufficient concentration to exceed to a substantial extent its compatibility limit with the resin so that after fusion of the resin it migrates therein and is expressible therefrom under pressure; introducing said dispersion into an open top mold; heating the dispersion to the blowing temperature of the blowing agent to effect the release of a gas; raising the temperature to the resin fusion temperature to fuse the resin particles; and then cooling the fused product to room temperature, thereby forming a fused porous solid from which substantial amounts of the non-drying, non-volatile organic liquid carrying the coloring matter is expressible.

5. The method as defined in claim 4 wherein the non-drying, non-volatile organic liquid includes blown castor oil as a major proportion thereof.

6. The method as defined in claim 5 wherein the non-drying- non-volatile organic liquid further includes oleic acid.

7. The method as defined in claim 5 wherein the coloring matter is alkali blue pigment.

8. The method as defined in claim 4 wherein the non-drying, non-volatile organic liquid is present from about 20 parts to about 100 parts, by weight, per 100 parts of the resin.

9. The method as defined in claim 4 wherein the blowing agent is N,N'-dimethyl-N,N'-dinitroso terephthalamide and is present from about 0.1 part to about 5 parts, by weight, per 100 parts of the resin.

10. An article of the character described having a liquid-filled synthetic resin structure which comprises a solid resin base and substantial amounts of liquids expressible therefrom under pressure, the article comprising the fused product of the method defined in claim 1.

11. An inking article of the character described having an ink-filled synthetic resin structure which comprises a solid resin base and substantial amounts of liquid ink expressible therefrom under pressure, the inking article comprising the fused product of the method defined in claim 3.

References Cited in the file of this patent

UNITED STATES PATENTS

| | | |
|---|---|---|
| 2,763,208 | Rockoff et al. | Sept. 18, 1956 |
| 2,777,824 | Leeds | Jan. 15, 1957 |
| 2,825,282 | Gergen et al. | Mar. 4, 1958 |

FOREIGN PATENTS

| | | |
|---|---|---|
| 714,606 | Great Britain | Sept. 1, 1954 |